UNITED STATES PATENT OFFICE.

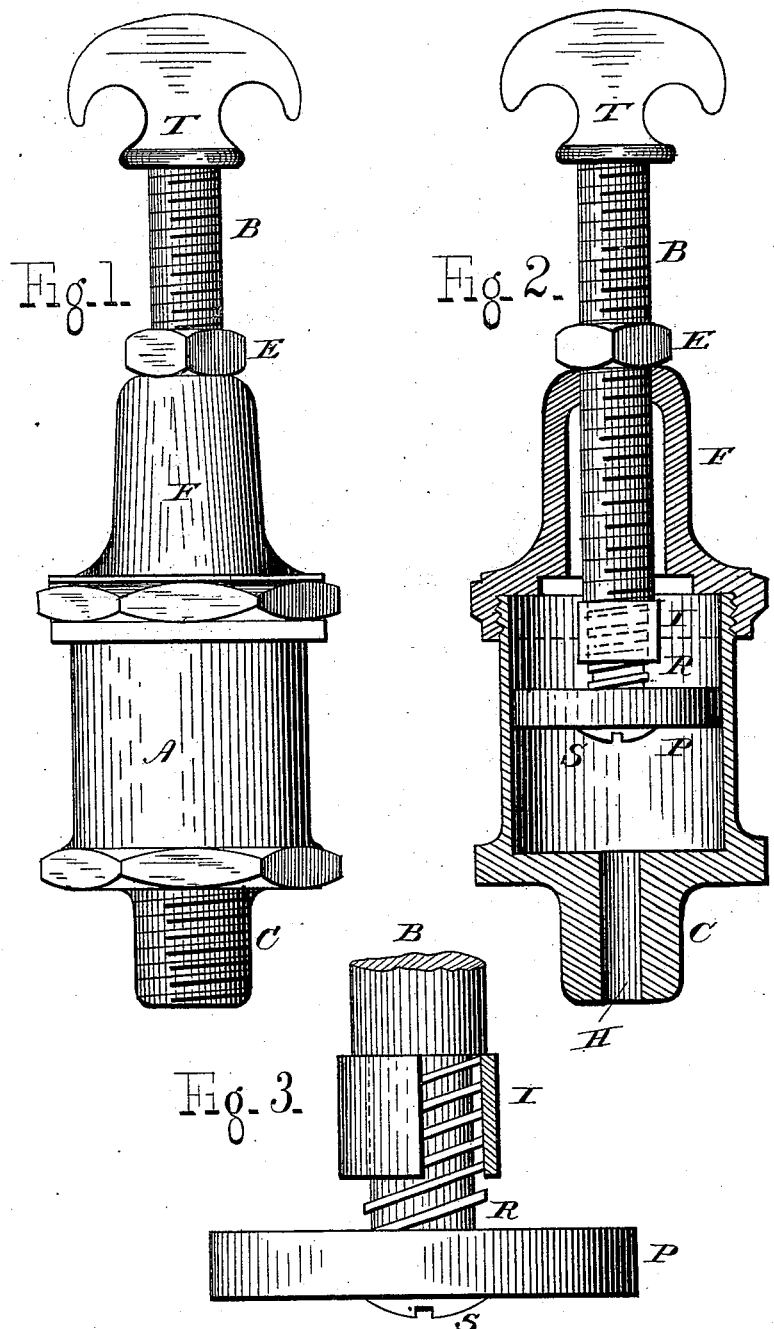

GEORGE TALIAFERRO SHACKELFORD, OF DENVER, COLORADO.

LUBRICATING-CUP.

SPECIFICATION forming part of Letters Patent No. 307,992, dated November 11, 1884.

Application filed September 6, 1884. (No model.)

*To all whom it may concern:*

Be it known that I, GEORGE TALIAFERRO SHACKELFORD, a citizen of the United States, residing at Denver, in the county of Arapahoe, State of Colorado, have invented certain new and useful Improvements in Lubricating-Cups; and I do hereby declare the following to be a full, clear, and exact description of the invention, such as will enable others skilled in the art to which it appertains to make and use it, reference being had to the accompanying drawings, which form part of this specification.

My invention relates to improvements in lubricating-cups.

Heretofore in lubricating-cups the piston that forces the lubricating substance through the cup relies upon the elasticity of the grease or fatty substance used to feed the bearings automatically. I find this to be objectionable from the fact that the grease is not sufficiently elastic to cause it to flow any length of time, and necessitates the piston being moved downward constantly.

The object of my invention is to provide a lubricating-cup of such construction that the piston will be free to move any desired distance, and allowed to force the grease or fatty substance automatically by means of a spring, and further, the stem or rod that operates the piston can indicate the quantity of grease in the cup.

My invention consists, first, of a lubricating-cup having the combination of stem or rod with the piston so arranged as to indicate the quantity of lubricating substance in the cup.

My invention further consists of a lubricating-cup that feeds automatically by means of a spring made to press against the piston and cause it to travel stated distances.

I am aware that prior to my invention lubricating-cups have been made and patented. The patent of July 3, 1883, has a stem with thread and piston, the stem being stationary, while the piston moves up and down along the stem and forces the lubricating substance out of the cup as the stem rotates; but there is no provision for any elasticity, consequently it cannot feed automatically; and, further, you cannot see the quantity of grease in the cup without removing the cover, which is inconvenient when used on crank-wheels of engines or any moving machine. I use my stem as an indicator, and the spring on the top of piston supplies an automatic force to feed the grease. I prefer to make my piston loose on the stem, so that it can move up or down at pleasure.

In the accompanying drawings, Figure 1 is an outside view showing the rod or stem projecting outside of the cup, indicating the quantity of grease therein. Fig. 2 is a vertical section. Fig. 3 is an enlarged view of piston with the spring.

T represents the thumb-piece for actuating the stem B. B is the stem, provided with a lock-nut, E, to prevent the rod from moving at pleasure. P is the piston, loosely fitted to the end of stem or rod B. S is a screw fastened to the stem B, and prevents the piston P from sliding off the rod B. R is the spring contained in the cylinder or guide I. I is the cylinder that guides the spring, and is made of sufficient length to permit the piston to travel upward when forced against the lubricating substance below the piston. F is the cover, with inside thread fitted to the stem and fastened to the body of cup A. A is the cylinder of cup. H is the hole or exit for grease. C is the threaded portion, which can be fitted to any portion of a bearing.

Having thus described my invention, what I claim as new, and desire to secure by Letters Patent, is—

1. In a lubricating-cup, the combination of a stem or rod, B, with the loosely-fitted piston, P, the spring R, and guide I, the parts being so arranged as to indicate the quantity of lubricating substance in the cup, substantially as shown and described.

2. In a lubricating-cup, the combination of a stem or rod, B, lock-nut E, the piston P, loosely fitted to said stem, spring R, and guide I, all substantially as shown, and for the purposes set forth.

In testimony that I claim the foregoing I have hereunto set my hand this 7th day of February, 1884.

GEORGE TALIAFERRO SHACKELFORD.

Witnesses:
 JOEL W. SHACKELFORD,
 JAMES A. FLEMING.